(12) United States Patent  
Fanjoy et al.

(10) Patent No.: US 8,848,528 B1  
(45) Date of Patent: Sep. 30, 2014

(54) NETWORK DATA FLOW COLLECTION AND PROCESSING

(71) Applicant: International Business Machines Corporation, Armonk, NY (US)

(72) Inventors: Christopher Wayne Fanjoy, Rothesay (CA); Christopher Daniel Newton, Douglas (CA); Jason Leger, Richibucto Road (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/709,683

(22) Filed: Dec. 10, 2012

Related U.S. Application Data (63) Continuation of application No. 10/936,820, filed on Sep. 9, 2004, now Pat. No. 8,331,234.

(60) Provisional application No. 60/607,576, filed on Sep. 8, 2004.

(51) Int. Cl.  
*H04L 12/26* (2006.01)

(52) U.S. Cl.  
USPC ........................................................ 370/231

(58) Field of Classification Search  
CPC ... H04L 12/2472; H04L 12/26; H04L 12/569; H04L 45/38  
USPC ................... 370/229–232, 235, 237, 395.21, 370/395.52, 253, 389, 395.2; 709/203, 225, 709/245, 250; 725/11, 13, 23, 25, 4  
See application file for complete search history.

(56) References Cited

U.S. PATENT DOCUMENTS

| | | |
|---|---|---|
| 5,166,674 A | 11/1992 | Baum et al. |
| 6,308,148 B1 | 10/2001 | Bruins et al. |
| 6,363,056 B1 | 3/2002 | Beigi et al. |
| 6,546,420 B1 | 4/2003 | Lemler et al. |
| 6,584,501 B1 | 6/2003 | Cartsonis et al. |
| 6,651,099 B1 | 11/2003 | Dietz et al. |
| 6,665,725 B1 | 12/2003 | Dietz et al. |
| 6,807,156 B1 * | 10/2004 | Veres et al. ................... 370/252 |
| 6,873,600 B1 | 3/2005 | Duffield et al. |
| 7,289,480 B2 | 10/2007 | Lundstrom et al. |
| 7,376,085 B2 | 5/2008 | Yazaki et al. |
| 7,385,924 B1 | 6/2008 | Riddle |
| 7,451,489 B2 | 11/2008 | Cantrell et al. |
| 7,499,412 B2 | 3/2009 | Matityahu et al. |
| 7,508,768 B2 | 3/2009 | Yoon et al. |
| 7,512,702 B1 * | 3/2009 | Srivastava et al. ............ 709/238 |
| 7,519,990 B1 | 4/2009 | Xie |

(Continued)

FOREIGN PATENT DOCUMENTS

| | | |
|---|---|---|
| CN | 1881899 A | 12/2006 |
| CN | 101051999 A | 10/2007 |

(Continued)

*Primary Examiner* — Raj Jain  
(74) *Attorney, Agent, or Firm* — Goodwin Procter LLP; Jeffrey S. LaBaw (57) ABSTRACT

Systems and methods are provided for collecting and analyzing packet data flows. A flow collector generates flow data records based on each packet that is observed at one or more network monitoring points. A flow processor receives the flow data records from one or more flow collectors and examines the flow data records to identify related flows. Further features, such as content capture and application identification, are also provided.

20 Claims, 8 Drawing Sheets

(56) References Cited

U.S. PATENT DOCUMENTS

| | | | |
|---|---|---|---|
| 7,522,602 B2 | 4/2009 | Yazaki et al. | |
| 2001/0037387 A1 | 11/2001 | Gilde et al. | |
| 2003/0223367 A1* | 12/2003 | Shay et al. | 370/231 |
| 2004/0095934 A1* | 5/2004 | Cheng et al. | 370/390 |
| 2005/0044422 A1* | 2/2005 | Cantrell et al. | 713/201 |
| 2005/0286423 A1 | 12/2005 | Poletto et al. | |
| 2006/0239219 A1 | 10/2006 | Haffner et al. | |
| 2007/0011317 A1 | 1/2007 | Brandyburg et al. | |
| 2007/0236366 A1 | 10/2007 | Gur et al. | |
| 2007/0297333 A1 | 12/2007 | Zuk et al. | |
| 2008/0205273 A1 | 8/2008 | Wackerly | |
| 2008/0279111 A1 | 11/2008 | Atkins et al. | |
| 2009/0144304 A1 | 6/2009 | Stephens et al. | |
| 2009/0185503 A1 | 7/2009 | Tan | |
| 2009/0222924 A1 | 9/2009 | Droz et al. | |
| 2009/0225655 A1 | 9/2009 | Ray et al. | |

FOREIGN PATENT DOCUMENTS

| | | |
|---|---|---|
| EP | 1791063 A1 | 5/2007 |
| FR | 2909502 A1 | 6/2008 |
| WO | WO-2003103237 | 12/2003 |
| WO | WO-2006108281 A1 | 10/2006 |

* cited by examiner

NETWORK DATA FLOW COLLECTION AND PROCESSING

CROSS-REFERENCE TO RELATED APPLICATIONS

This application is a continuation of U.S. application Ser. No. 10/936,820, filed Sep. 9, 2004, which claims the benefit of and priority to U.S. Provisional Application No. 60/607,576, filed Sep. 8, 2004, the complete disclosures of all of which are incorporated by reference herein.

TECHNICAL FIELD

This invention relates generally to data network monitoring, and more particularly, to collecting packet flows from a network monitoring point and to processing the collected flow information.

BACKGROUND

Communication networks are increasingly using packet-switching techniques for interconnecting systems on both local and wide area networks. A packet is the unit of data that is routed between an origin and a destination on a packet-switched network, such as the Internet. Enterprises have come to rely on applications, such as electronic mail, that use these packed-based communications. However, enterprise networks that are interconnected with widely deployed packet-switched networks, such as the public Internet, are vulnerable to security and availability threats.

The data traffic passing through a network can be monitored in order to detect or address network security and availability concerns. Flow collection is the process of monitoring network traffic from one or many network segments and grouping related individual packets into a logical relationship known as a flow. A flow can be defined as a communication session between a distinct source address/port and/or a distinct protocol-specific property such as a source and destination address/port. A flow record distills the individual packets transmitted (and received in the case of a bi-directional flow record) as part of this communication session into one or more data records that describe the communication in a format that can be more easily analyzed for traffic analysis purposes or identification of security risks.

One conventional approach to network monitoring samples the packets that are visible on a network interface. Sampling means processing some packets and letting other packets pass the network interface or monitoring point unprocessed. While this approach reduces the number of packets that must be analyzed, enterprise policy violations (such as excessive peer-to-peer usage) may be overlooked. Furthermore, sampling may overlook important security concerns, such as Trojan or back-door programs that are listening on unknown ports.

Additionally, application analysis can be an important component of identifying security risks. For example, a secure shell (SSH) service running on an atypical port may represent a security concern. Conventional approaches to application identification only use packet header data, which does not necessarily result in an accurate identification of the communicating applications. These conventional approaches often rely on predetermined, static port assignments (such as a file transfer protocol (FTP) service listening on port 21) to identify the application associated with a flow record. However, packet header data or static understandings about port assignments are insufficient to identify accurately the applications that are involved in the communication session.

Other conventional network monitoring approaches also lack the capability to capture packet content (i.e., payload data) from the flow during the creation of flow data records. Typical network monitoring tools can be configured to capture or store packet content only after a security event has been triggered. A problem with this approach, however, is that important details about the root cause of the security event may be lost because these details were communicated at the beginning of the flow before the event was triggered.

What is needed is a flow collector that generates flow data records based on each packet that is observed at one or more network monitoring points. What is further needed is a flow data record that includes a configurable amount of packet content that can be used for analysis, such as application identification or security forensics.

SUMMARY OF THE INVENTION

In one aspect, a method for processing data packets is provided. The method includes receiving a set of data packets from a network interface, parsing the received set of data packets into at least one packet flow, populating a flow data record for describing at least one packet flow, accumulating flow statistics in a reporting buffer. Additionally, the method can store content from at least one packet flow in the flow data record, and identify an application from the stored content.

In another aspect, a method of creating a flow bundle record for describing a plurality of related packet flows is provided. The method includes receiving a first flow data record describing a first packet flow and receiving a second flow data record describing a second packet flow. The first flow data and the second flow data records have source and destination address data. The method determines whether a relationship exists between the first and second flow data records.

In a further aspect, a flow data record is disclosed for describing a packet flow between a first host and a second host. The flow data record includes fields for storing a source address and a port value corresponding to the first host, a destination address field for storing an address and port value corresponding to the second host, and a content field for storing a predetermined amount of content from the packet flow.

In another aspect, a system for processing data packets is disclosed. The system includes a network interface configured to receive a set of data packets and a flow collector module operatively coupled to the network interface. The flow collector parses the received set of data packets into at least one packet flow, populates a flow data record for describing at least one packet flow, accumulates flow statistics in a reporting buffer, stores content from at least one packet flow in the flow data record, and identifies an application from the stored content.

In a further aspect, a computer program product for storing a program instructions is provided. The computer program product enables a computing device to receive a set of data packets from a network interface, to parse the received set of data packets into at least one packet flow, to populate a flow data record for describing at least one packet flow, to accumulate flow statistics in a reporting buffer, to store content from at least one packet flow in the flow data record, and to identify an application from the stored content.

Further features of the invention, its nature and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

The present invention is now described more fully with reference to the accompanying figures, in which several embodiments of the invention are shown. The present invention may be embodied in many different forms and should not be construed as limited to the embodiments set forth herein. Rather these embodiments are provided so that this disclosure will be thorough and complete and will fully convey the invention to those skilled in the art.

One skilled in the art will recognize that methods, apparatus, systems, data structures, and computer program products implement the features, functionalities, or modes of usage described herein. For instance, an apparatus embodiment can perform the corresponding steps or acts of a method embodiment.

A. System Overview

In an embodiment of the present invention, data packets are logically arranged into flows. A flow can be defined as a communication session between a distinct source address/port and/or a distinct protocol-specific property such as a source and destination address/port. That is, the packets that are communicated between a first host and a second host for a given communications session are considered one flow. A host refers to a client or server device (e.g., a computing device) that is coupled with and communicates on a packet-switched network.

A flow data record represents a synopsis of the flow. More specifically, in certain embodiments, a flow data record includes packet header information, octet counts or other statistics, and a configurable amount of application-level content. Flow data records are useful for network monitoring and analysis. For example, flow data records can be provided to a classification engine that identifies anomalous traffic patterns, security breaches, or other network issues.

In certain embodiments, packets of the same protocol that have a unique source port and unique destination port are considered discrete packet flows. However, for some types of network traffic, discrete packet flows are related such that it is possible to reduce the number of flow data records created without losing granularity in the description of the flows. A flow bundle data record can be used to describe multiple flows in a concise format that accurately represents the original data on the network. For example, an application may open a plurality of concurrent transmission control protocol (TCP) connections to a server. This may be done to accelerate the delivery of content from the server to the client. A flow bundle data record can be used to collapse this behavior into a structure that properly describes that the client and the server communicated on an array of source ports and one static destination port, along with the individual start and end times of original packet flows. One advantage of a flow bundle is a reduction in data processing and data storage requirements.

Figure 1:
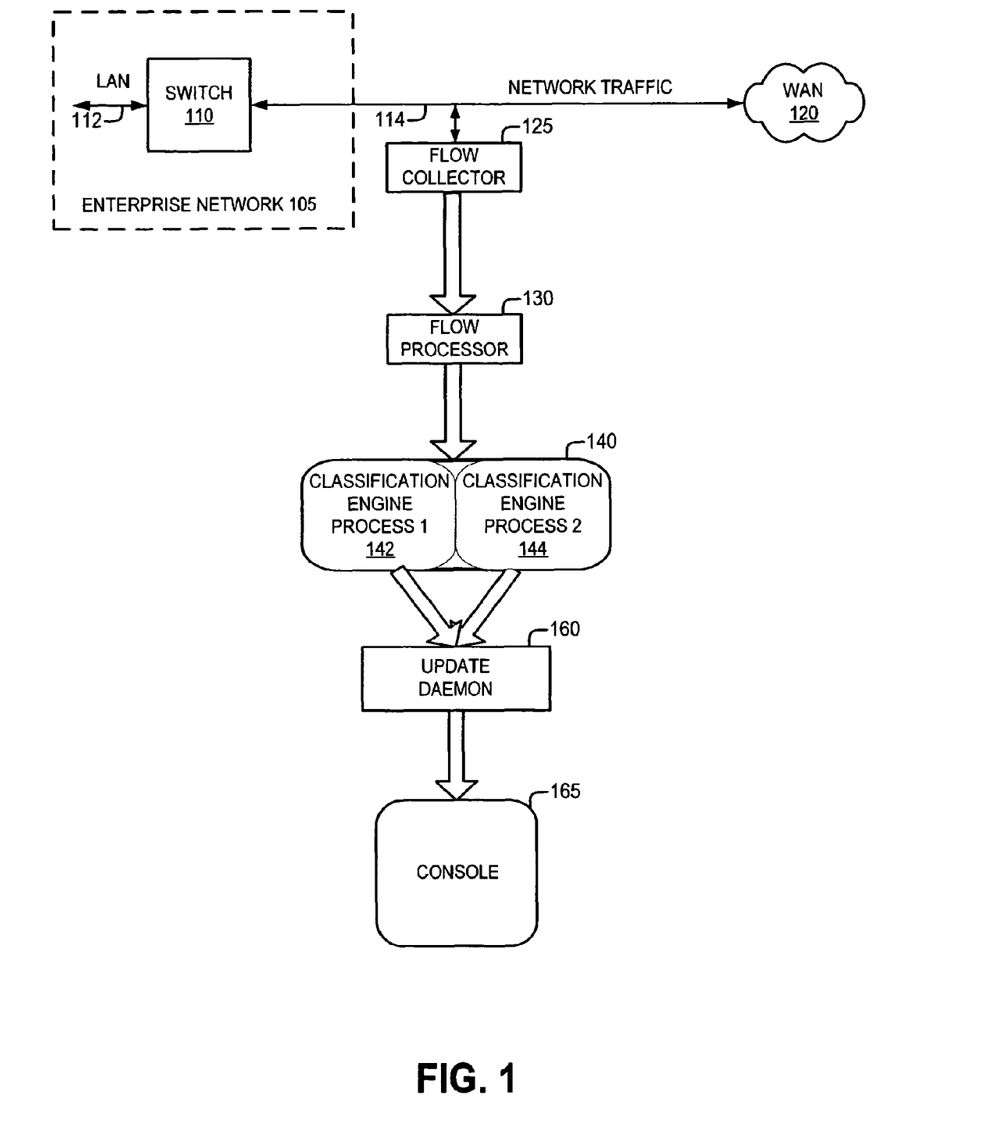
FIG. 1 illustrates a system architecture and functional overview of an embodiment of the present invention.

FIG. 1 illustrates a system architecture and functional overview of an embodiment of the present invention. The illustrated embodiment includes an enterprise network 105 and a wide area network (WAN) 120. The enterprise network 105 includes a switch 110. The switch 110 operatively couples hosts (i.e., computing devices) within the enterprise network 105 to the WAN 120. More specifically, the switch 110 has one or more interfaces for providing local area network (LAN) 112 connections and WAN 114 connections. Although not specifically illustrated, the enterprise network 105 may include a plurality of local hosts communicatively coupled to the LAN 112. The plurality of local hosts communicate with each other on the LAN 112 and remote hosts on the WAN 120.

In the illustrated embodiment, a flow collector 125 is operatively coupled to the WAN link 114 to monitor network traffic ingress and egress from the enterprise network 105. More specifically, the flow collector 125 can passively monitor (e.g., using taps, mirrors, or spans) the packet data that is transported on the WAN link 114. As one skilled in the art will appreciate, the flow collector 125 can be configured with a variety of network interfaces that are designed to communicate with the particular medium of the WAN link 114.

The flow collector 125 constructs packet flows from the data packets that are observed on the WAN link 114. That is, the flow collector 125 performs a reassembly of asynchronous packet-based connections. The flow collector 125 also populates flow data records based on the observed flows. The flow data records include packet header information (e.g., source/destination address and port) and a configurable amount of packet payload data. For example, the flow collector 125 stores 256 octets of application-level (layer 7) data from the beginning of the flow. This data typically includes uniform resource locators (URLs), file names, and user data that can be useful for analyzing network usage, availability concerns (e.g., denial of service attacks), and security issues.

The console 165 includes a database of application signatures that are communicated to the flow collector 125 to be used to identify the application that is producing or consuming the flow. Flow data records may also indicate the application or applications involved with the flow. Application identification can be useful when flow data records are used to trigger various events. For example, the operator of the enterprise network 105 may establish a peer-to-peer usage threshold for each host. Analysis of the flow data records can trigger an alert when the usage threshold is exceeded.

In an embodiment, the flow collector 125 can perform format conversion for other types of flow data records, such as the NetFlow format (which is commercially implemented by Cisco Systems, Inc. of San Jose, Calif.). As one skilled in the art will recognize, the NetFlow format does not provide application-level content, so this information is not included in the resulting flow data records. However, the packet header data can be converted and incorporated into flow data records. Further details of the operation of the flow collector 125 are described below and with reference to FIGS. 2-4.

The flow collector 125 provides flow data records to a flow processor 130. The flow processor 130 removes duplicate flow data records and performs flow bundling. A flow bundle data record can be used to describe multiple flows in a concise format that accurately represents the original data on the network. For example, an application may open a plurality of concurrent transmission control protocol (TCP) connections to a server. This may be done to accelerate the delivery of content from the server to the client. A flow bundle data record can be used to collapse this behavior into a structure that properly describes that the client and the server talked on an array of source ports and one static destination port, along with the individual start and end times of original packet flows. One advantage of a flow bundle is a reduction in data processing and data storage requirements. For example, during a denial of service attack directed to the enterprise network 150, thousands of discrete, but similar flow data records could be created. Instead of maintaining thousands of discrete flow data records with almost identical information, a complete set of information (such as packet headers and content) can be captured in a single flow bundle data record.

The flow processor 130 provides discrete and bundled flow data records to the classification engine 140. In the illustrated embodiment, the classification engine 140 employs two classification processes 142, 144. The software architecture of the classification engine 140 enables distribution of the data processing workload to one or more processes 142, 144. One skilled in the art will appreciate that other system entities, such as the flow collector 125, flow processor 130, update daemon 160, and console 165, may also use distributed workload approaches to ensure that data is processed efficiently to provide a current (i.e., real-time or near real-time) view of the network traffic 114.

The classification engine 140 is generally responsible for creating view objects, counting specific properties of the view objects, correlating/filtering data, and triggering events based on configurable conditions. This data is provided to the update daemon 160, which recurrently updates the database with the current view objects and counts created or updated by the classification engine and the flow records for the current interval. As one skilled in the art will appreciate, the database may be on the same physical system as the update daemon 160 or a separate physical system accessible via conventional file system mounting or client-server access.

One skilled in the art will appreciate that features or functions of the flow collector 125, the flow processor 130, the classification engine 140, the update daemon 160, and the console 165 can be implemented using program code modules that execute on a conventional computing device, such as the computing device 805 described below and with reference to FIG. 8. Additionally, the functionality of the flow collector 125, the flow processor 130, the classification engine 140, the update daemon 160, and the console 165 may be distributed among a plurality of computing devices using component software architectures or other conventional distributed computing techniques.

B. Flows

Figure 2:
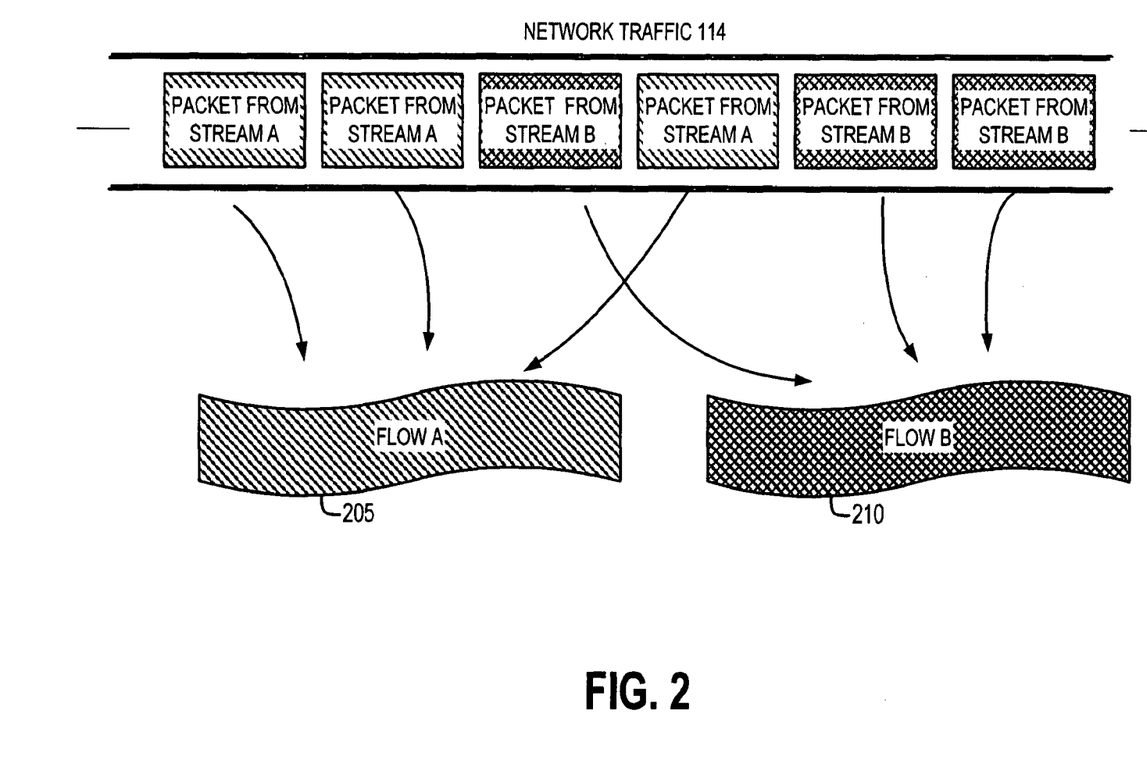
FIG. 2 illustrates flow creation according to an embodiment of the present invention.

FIG. 2 illustrates flow creation according to an embodiment of the present invention. In the illustrated embodiment, the network traffic 114 is assembled into flow A 205 and flow B 210. As packets from stream A arrive at the network interface of the flow collector 125, the stream A packets are assembled into a logical flow A 205 relationship Likewise, as packets from stream B arrive at the network interface of the flow collector 125, the stream B packets are assembled into flow B 210. As described in further detail below, the flow collector 125 may use a flow activity timer to determine whether a flow is active or expired. For example, for a TCP flow, the flow collector 125 waits 60 seconds after receiving a stream A packet before declaring the flow expired. If another stream A packet arrives before the flow activity timer has expired, then the timer is reset.

C. Flow Data Records

Figure 3:
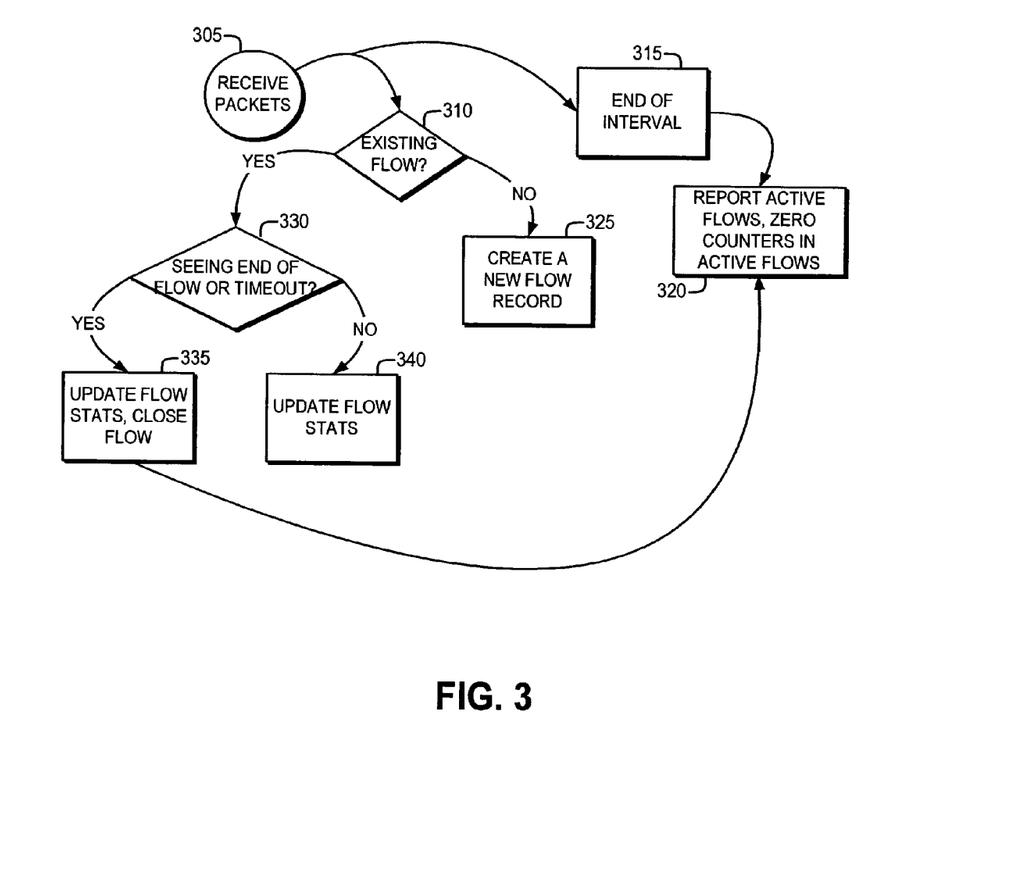
FIG. 3 is a flowchart illustrating a method for populating flow data records according to an embodiment of the present invention.

FIG. 3 is a flowchart illustrating a method for populating flow data records according to an embodiment of the present invention. The method begins with receiving a set of data packets 305. The method determines 310 whether the received packets correspond with an existing flow. If a flow data record does not exist, a new flow data record is created 325. If the received packet or packets corresponds with an existing flow, then the method determines 330 whether the flow has ended. In certain embodiments, the method identifies protocol-specific control information within the data packet that signals the end of a communication session.

The method may also use a flow activity timer to recognize the end of a flow. At the end of a reporting interval, the flow collector 125 determines whether flows are active or expired. The timeout duration may be a network administrator configurable parameter for protocols such as TCP, user datagram protocol (UDP), and Internet control message protocol (ICMP). In certain embodiments, the timeout duration for TCP defaults to a value of 60 seconds of non-activity. The default duration for other protocols is non-activity during one reporting interval. Reporting intervals are described in further detail below.

If the flow has not ended or expired (e.g., the flow is active), then the method updates 340 buffered flow statistics (e.g., packet count, octet count, and duration). If the flow has ended or expired, the buffered flow statistics are updated 335 and flow is indicated as closed. The method then continues to step 320, in which the active flows are reported and the buffered flow statistics are cleared.

Returning to the receiving 305 of data packets, the method also determines whether the end of a reporting interval 315 has been reached. In one embodiment, the method recurrently (or periodically) reports or updates flow data records with current flow statistics or content. As one skilled in the art will appreciate, the duration or occurrence of a reporting interval is a configurable operational parameter. In an example configuration, the method reports or updates flow data records in periodic intervals, in which each interval has a duration of about 30 seconds. This provides a near real-time view of the network traffic to subsequent processing entities (e.g., the classification engine 140) or a user interface.

Furthermore, fuzzy intervals may be used to adjust the reporting of some flows. A fuzzy interval is a predetermined threshold (duration of time before the end of a recurrent reporting interval) that if a flow is created within this predetermined threshold, the new flow is considered to have been created in the following reporting interval. A typical default value for a fuzzy interval is $\frac{1}{10}$ second. One advantage of a fuzzy interval is a reduction in the number of false security events being triggered by small amounts of flow data being observed nearly coincident in time with a reporting interval.

A content only flow is created when a flow has timed out, but content has been buffered that needs to be sent to the flow processor 130. As one skilled in the art will appreciate, flow reporting and collection can occur during interleaved intervals. That is, during a first interval data is collected. During a second interval, the data collected during the first interval is reported concurrently with additional data collection. One advantage of interleaved intervals is a distribution of data processing workload on the system entities (e.g., the flow processor 130).

Figure 4:
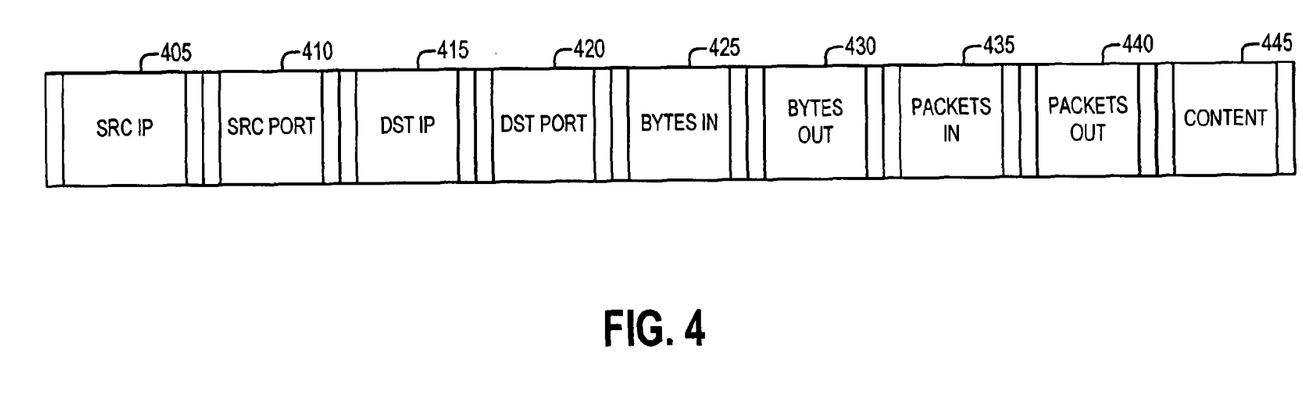
FIG. 4 illustrates an exemplary flow data record including packet content according to an embodiment of the present invention.

FIG. 4 illustrates an exemplary flow data record including packet content according to an embodiment of the present invention. In the illustrated embodiment, the flow data record includes fields for source IP address 405, source port 410, destination IP address 415, and destination port 420. Also included in the illustrated embodiment are counting fields for bytes (octets) in 425, bytes out 430, packets in 435, and packets out 440. As described above, content 445 includes a variable amount of application layer content that is obtained from the beginning of the flow. As one skilled in the art will appreciate, content 445 is an optional portion of the flow data record. A network administrator or user of the system (e.g., human or computing device) may configure the amount of content to be captured (including no content capture) for some packet flows. For instance, the network administrator may want to capture more content from unknown application types and less content from known or identified application types.

As one skilled in the art will recognize, more or fewer fields may be included in the flow data record. For example, for an ICMP flow, the port fields 410, 420 may not be needed, but rather type/code fields can be included.

D. Flow Bundling

Figure 5:
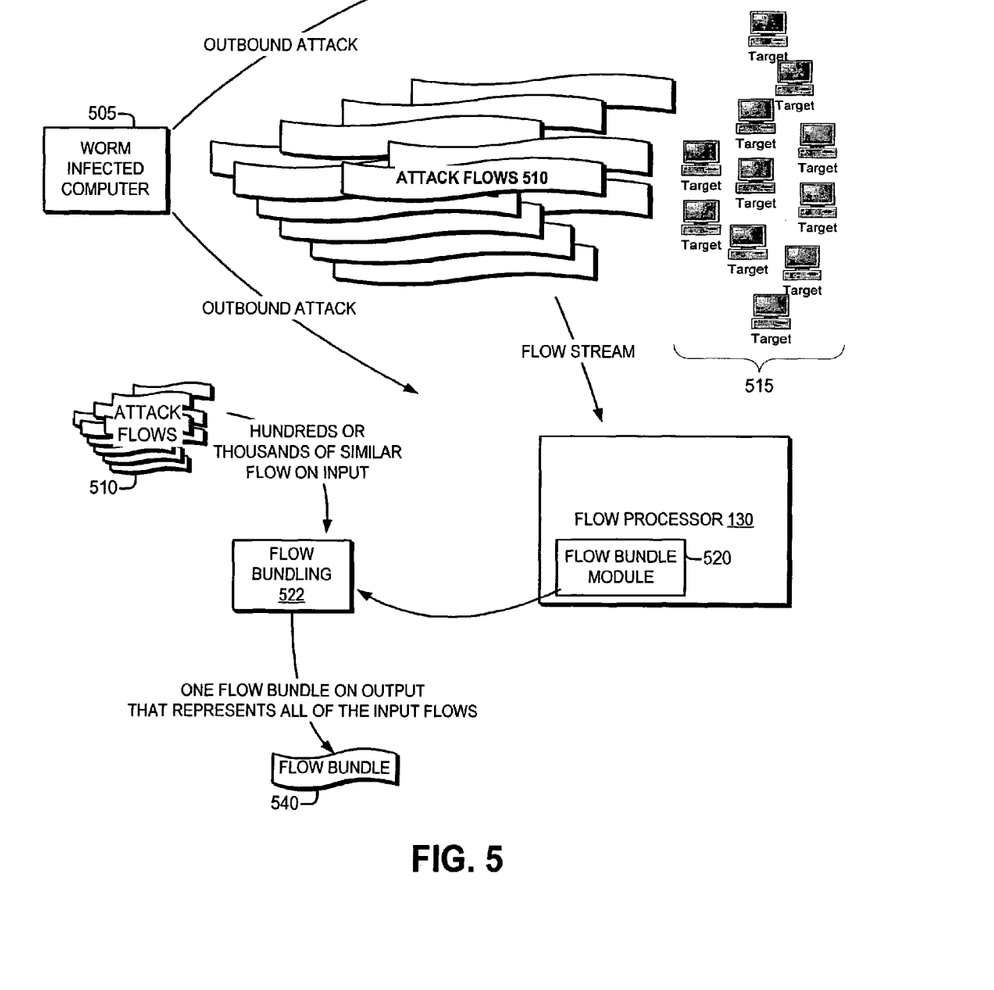
FIG. 5 illustrates flow bundling according to an embodiment of the present invention.

FIG. 5 illustrates flow bundling according to an embodiment of the present invention. In the illustrated embodiment, a worm-infected computer 505 is shown initiating an outbound attack flow 510 to a plurality of target hosts 515. In the embodiment described above, the flow collector 125 provides an output of flow data records to the flow processor 130. Each flow data record describes a communications session between a unique source address and port and a unique destination address and port.

Therefore, the flow collector 125 considers each communication from the worm-infected computer 505 to one of the plurality of target hosts 515 as a distinct data flow. These data flows are provided to the flow processor 130, which includes a flow bundle module 520. The flow bundle module 520 uses a flow bundling process 522 to identify related flows and groups these flows into a flow bundle data record 540. Further details of the flow bundling process 522 are provided below and with reference to FIG. 6.

The flow bundle data record 540 removes the duplication associated with having hundreds or thousands of similar flow data records without compromising the detailed granularity of the packet data capture, packet headers, or other information that may be useful for security forensics or traffic analysis.

Although one type of flow bundling is illustrated, one skilled in the art will appreciate that other types of network traffic may also be concisely described using flow bundles. For example, a second type of unidirectional traffic occurs when one remote host communicates with multiple local hosts on a particular destination port. This type of flow is typically caused by a remote host performing a port scanning operation on many local hosts. This type of flow may also occur if multiple local hosts are involved in a distributed denial of service attack against one remote host.

A third type of unidirectional flow occurs when one local host communicates with one remote host on multiple destination ports. In this situation, the ports on one or both hosts may be changing. This type of flow occurs during both internal and external port scans of hosts.

A fourth type of flow bundle occurs during a typical bi-directional client-server communication in which multiple requests are made by the client to the server on the same destination port.

For example, an Internet browser application (i.e., client application) can open a number of connections to a server to speed the delivery of content by parallelizing the flow of information from the server to the client application.

Figure 6:
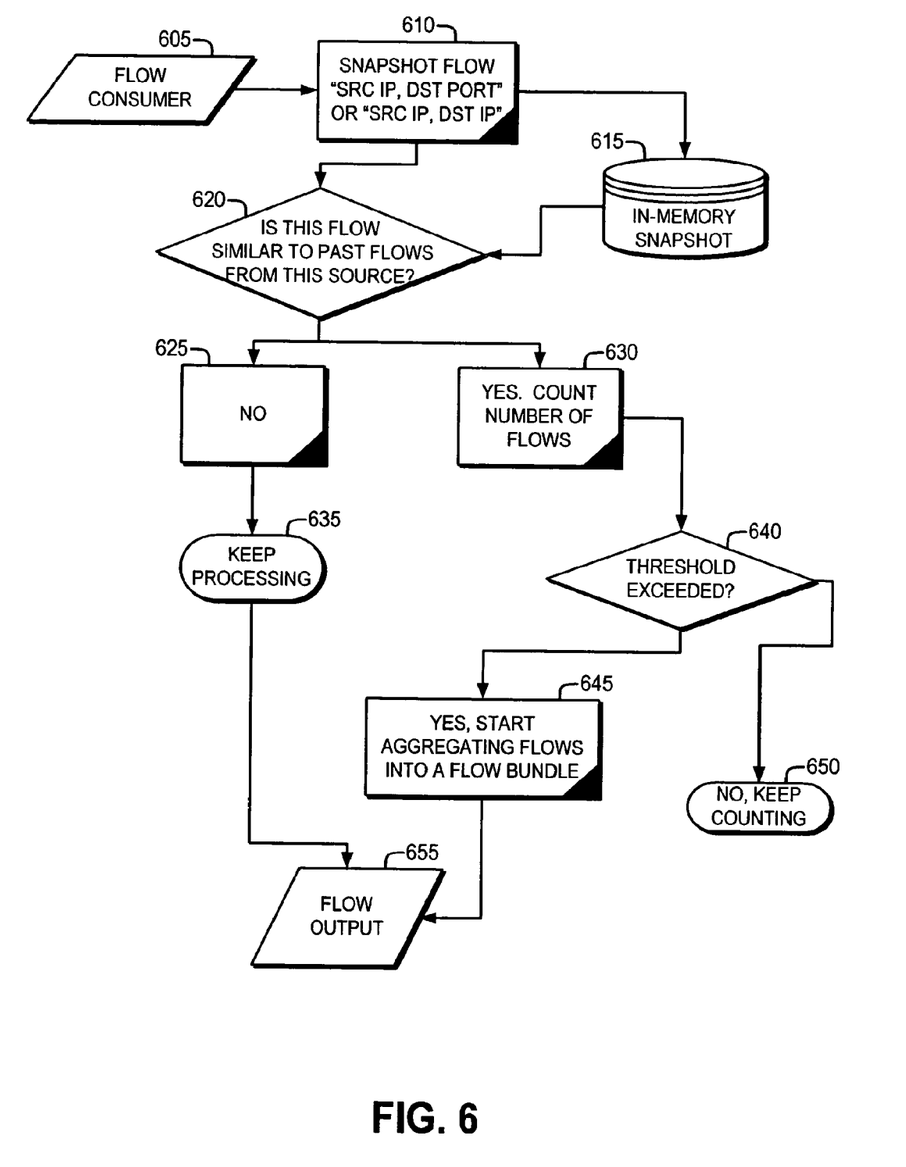
FIG. 6 is a flowchart illustrating a method for generating flow data records for flow bundles according to an embodiment of the present invention.

FIG. 6 is a flowchart illustrating a method for generating flow data records for flow bundles according to an embodiment of the present invention. In certain embodiments, the flow bundle module 520 of the flow processor 130 implements the illustrated flow bundling process concurrently with the flow generation process described above and with reference to FIG. 3.

The method receives flows or flow data records from a flow consumer 605 and snapshots 610 the flow information. The snapshot 610, which includes a least a portion of the flow data record, is stored in an in-memory snapshot repository 615. The in-memory snapshot repository 615 functions as a buffer from which the method can compare recently received flows with historical flows (e.g., flows received earlier in time than a current snapshot). In step 620, the method determines whether a relationship exists between a current flow (as provided by the snapshot 610) and one or more historical flows provided from the in-memory snapshot repository 615.

If the current snapshot is similar to historical flows, then the method counts 630 the number of flows. If not similar 625, the method continues processing 635.

In step 640, the method determines whether a threshold has been reached or exceeded regarding the number of similar flows. In certain embodiments, the threshold is 3 to 4 similar flows, but as one skilled in the art will appreciate, the threshold is configurable. If the threshold has not been reached, the method continues counting 650 similar flows. If the threshold has been reached or exceeded, the method generates 645 an aggregated flow or flow bundle. The flow bundle is then passed to the flow output 655. In certain embodiments, as described above, the flow bundle is provided as output until the end of a reporting interval.

One skilled in the art will appreciate that in the illustrated embodiment, flows pass through untouched until the threshold is reached. That is, in the illustrated embodiment, some flows may be passed to the flow output 655 before the threshold is reached and those flows are not incorporated into a flow bundle.

Figure 7:
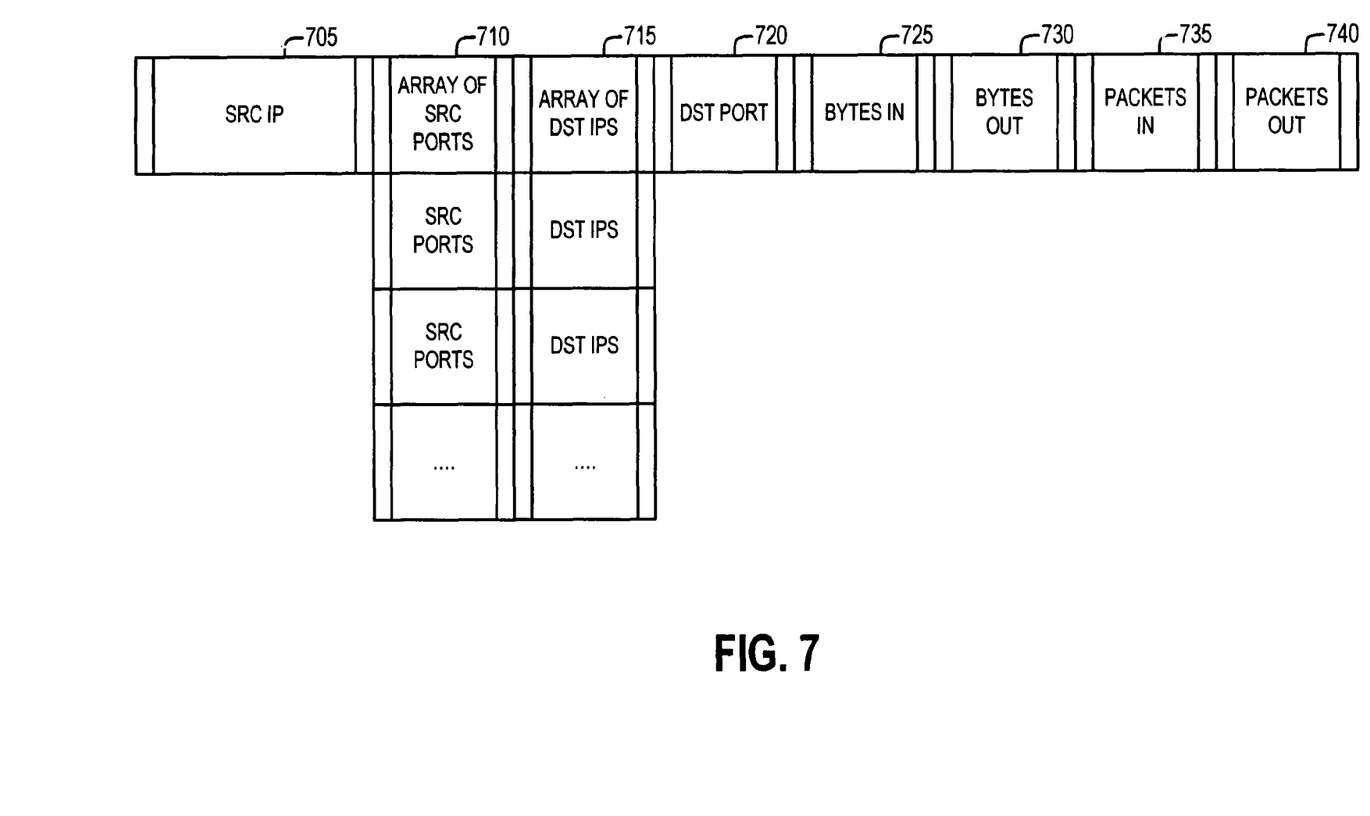
FIG. 7 illustrates an exemplary flow data record for a flow bundle according to an embodiment of the present invention.

FIG. 7 illustrates an exemplary flow data record for a flow bundle according to an embodiment of the present invention. In the illustrated embodiment, the flow data record includes fields for source IP address 705, a plurality of source ports 710, a plurality of destination IP addresses 715, and destination port 720.

Also included in the illustrated embodiment are counting fields for bytes (octets) in 725, bytes out 730, packets in 735, and packets out 740. In the illustrated example, the flow bundle data record represents unidirectional and no content is included.

Figure 8:
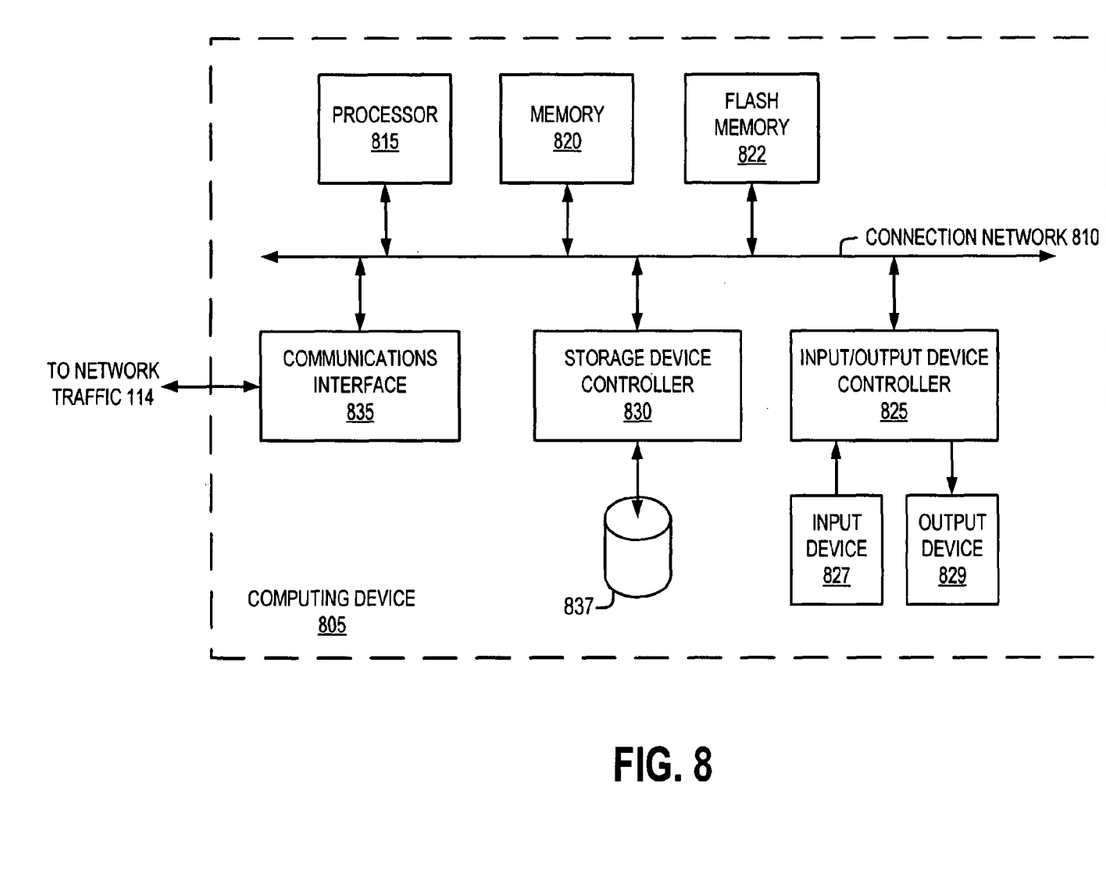
FIG. 8 illustrates a computing device architecture for implementing an embodiment of the present invention.

FIG. 8 illustrates a computing device architecture for implementing the system entities or functional modules in embodiments of the present invention. In the illustrated embodiment, the computing device 805 includes a connection network 810, a processor 815, a memory 820, a flash memory 822, an input/output device controller 825, an input device 827, an output device 829, a storage device controller 830, and a communications interface 835. Also included is a storage device 837.

The connection network 810 operatively couples each of the processor 815, the memory 820, the flash memory 822, the input/output device controller 825, the storage device controller 830, and the communications interface 835. The connection network 810 can be an electrical bus, switch fabric, or other suitable interconnection system.

The processor 815 is a conventional microprocessor. The processor 815 executes instructions or program code modules from the memory 820 or the flash memory 822. The operation of the computing device 805 is programmable and configured by the program code modules. Such instructions may be read into memory 820 or the flash memory 822 from a computer readable medium, such as a device coupled to the storage device controller 830. In addition, instructions may be read into the memory 820 or the flash memory 822 from the storage device 837.

Execution of the sequences of instructions contained in the memory 820 or the flash memory 822 cause the processor 815 to perform the method or functions described herein. In alternative embodiments, hardwired circuitry may be used in place of or in combination with software instructions to implement aspects of the disclosure. Thus, embodiments of the present invention are not limited to any specific combination of hardware circuitry and software. The memory 820 can be, for example, one or more conventional random access memory (RAM) devices. The flash memory 822 can be one or more conventional flash RAM, or electronically erasable programmable read only memory (EEPROM) devices. The memory 820 may also be used for storing temporary variables or other intermediate information during execution of instructions by processor 815.

In an embedded system or network appliance embodiment of the present invention, the flash memory 822 can include program code modules or data. The computer program instructions associated with the program code modules are communicated to the processor 815 via the connection network 810. Program instructions may be executed directly from the flash memory 822 or communicated to the memory 820 before execution by, the processor 815.

The input/output device controller 825 provides an interface to the input device 827 and the output device 829. The output device 829 can be, for example, a conventional display screen. The display screen can include associated hardware, software, or other devices that are needed to generate a screen display. In one embodiment, the output device 829 is a conventional liquid crystal display (LCD). The display screen may also include touch screen capabilities. The illustrated embodiment also includes an input device 827 operatively coupled to the input/output device controller 825. The input device 827 can be, for example, an external or integrated keyboard or cursor control pad.

The storage device controller 830 can be used to interface the processor 815 to various memory or storage devices. In the illustrated embodiment, a storage device 837 is shown for storing software applications, packet flows, flow data records, network parameters, user data, system configuration, and the like. As one skilled in the art will appreciate, the storage device 837 can be any suitable storage medium, such as magnetic, optical, or electrical storage.

The communications interface 835 provides bidirectional data communication coupling for the computing device 805. The communications interface 835 can be functionally coupled to a network monitoring point, such as WAN 114. In one embodiment, the communications interface 835 provides one or more input/output ports for receiving electrical, radio frequency, or optical signals and converts signals received on the port(s) to a format suitable for transmission on the connection network 810. The communications interface 835 can include a radio frequency modem and other logic associated with sending and receiving wireless or wireline communications. For example, the communications interface 835 can provide an Ethernet interface, Bluetooth, and/or 802.11 wireless capability for the computing device 805.

Having described embodiments of network data flow collection and processing (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

What is claimed is:

1. A computer implemented method for processing data packets, the method comprising:
    receiving, at a flow collection module, a set of data packets from a network interface;
    parsing the received set of data packets into at least one packet flow;
    populating a flow data record for describing the at least one packet flow;
    accumulating flow statistics in a reporting buffer;
    storing content from the at least one packet flow in the flow data record; and
    identifying an application from the stored content.

2. The computer implemented method for processing data packets of claim 1, further comprising:
    sending the flow data record to a flow processor for creating a flow bundle.

3. The computer implemented method for processing data packets of claim 1, further comprising:
    storing the flow data record in a database; and
    reporting flow statistics to update the flow data record stored in the database.

4. The computer implemented method for processing data packets of claim 3, wherein reporting flow statistics is recurrently performed at a reporting interval.

5. The computer implemented method for processing data packets of claim 3, wherein reporting flow statistics is performed at a fuzzy interval.

6. The computer implemented method for processing data packets of claim 1, wherein populating a flow data record comprises:
    determining whether the at least one packet flow has ended;
    reporting, to a database, flow statistics to update the flow data record responsive to the determining; and
    closing the flow data record.

7. The computer implemented method for processing data packets of claim 6, wherein determining whether the at least one packet flow has ended comprises:
    detecting a protocol-specific flow termination control command.

8. The computer implemented method for processing data packets of claim 6, wherein determining whether the at least one packet flow has ended comprises: determining whether a flow activity timer has expired.

9. The computer implemented method for processing data packets of claim 8, wherein duration of the flow activity timer is configurable by protocol type.

10. The computer implemented method for processing data packets of claim 1, storing content from the at least one packet flow comprising storing a configurable amount of application-level data.

11. The computer implemented method for processing data packets of claim 1, storing content from the at lest one packet flow comprising storing a part of a data packet payload.

12. The computer implemented method for processing data packets of claim 1, identifying an application from the stored content comprising identifying an application from the stored content comprising:
   accessing a database of application signatures;
   matching the stored content to a record in the record of application of signatures.

13. A system for processing data packets, the system comprising:
   a network interface configured to receive a set of data packets;
   a flow collector module operatively coupled to the network interface and configured:
      to parse the received set of data packets into at least one packet flow;
      to populate a flow data record for describing the at least one packet flow;
      to accumulate flow statistics in a reporting buffer;
      to store content from the at least one packet flow in the flow data record; and
      to identify an application from the stored content.

14. The system of claim 13, further comprising: a flow processor operatively coupled to the flow collector and configured to remove duplicate flow records.

15. The system of claim 13, further comprising: a flow processor operatively coupled to the flow collector and configured to create a flow bundle data record for related flow data records.

16. The system of claim 15, wherein the flow bundle data record describes a unidirectional communication between a local host and a plurality of remote hosts on a fixed destination port.

17. The system of claim 15, wherein the flow bundle data record describes a unidirectional communication between a remote host and a plurality of local hosts on a fixed destination port.

18. The system of claim 15, wherein the flow bundle data record describes a communication between a local host and a remote host in which at least one of the source and destination ports is changing.

19. The system of claim 15, wherein the flow processor is further configured to determine whether a predetermined number of unidirectional communications has occurred before creating the flow bundle data record.

20. A computer program product for storing a program instructions to enable a computing device to perform a method comprising:
   receiving a set of data packets from a network interface;
   parsing the received set of data packets into at least one packet flow;
   populating a flow data record for describing the at least one packet flow;
   accumulating flow statistics in a reporting buffer;
   storing content from the at least one packet flow in the flow data record; and
   identifying an application form the stored content.

* * * * *